US008696776B2

(12) United States Patent
Nishijima (10) Patent No.: US 8,696,776 B2
(45) Date of Patent: Apr. 15, 2014

(54) ABNORMALITY DETERMINATION APPARATUS FOR PARTICULATE FILTER

(75) Inventor: Hiroki Nishijima, Suntou-gun (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 13/515,417

(22) PCT Filed: Mar. 8, 2011

(86) PCT No.: PCT/IB2011/000493
§ 371 (c)(1),
(2), (4) Date: Jun. 12, 2012

(87) PCT Pub. No.: WO2011/110920
PCT Pub. Date: Sep. 15, 2011

(65) Prior Publication Data
US 2012/0324841 A1    Dec. 27, 2012

(30) Foreign Application Priority Data
Mar. 9, 2010    (JP) .................................. 2010-051801

(51) Int. Cl.
*B01D 39/14*    (2006.01)
*B01D 39/06*    (2006.01)
*B01D 24/00*    (2006.01)
*B01D 50/00*    (2006.01)

(52) U.S. Cl.
USPC ............... 55/282.3; 55/522; 55/523; 55/524; 422/169; 422/170; 422/171; 422/172; 422/177; 422/178; 422/179; 422/180; 422/181; 422/182

(58) Field of Classification Search
USPC ................. 55/282.3, 522–524; 422/169–172, 422/177–182
See application file for complete search history.

(56) References Cited

U.S. PATENT DOCUMENTS 5,067,973 A * 11/1991 Pattas ................................ 95/12
6,964,694 B2 * 11/2005 Rauchfuss et al. .................. 95/1
(Continued)

FOREIGN PATENT DOCUMENTS

DE    10 2006 057 528 A1    6/2007
EP          1 992 800 A1    11/2008
(Continued)

OTHER PUBLICATIONS

International Search Report issued in International Application No. PCT/IB2011/000493 dated Jun. 7, 2011.
(Continued)

*Primary Examiner* — Amber Orlando
(74) *Attorney, Agent, or Firm* — Oliff PLC (57) ABSTRACT

An abnormality determination apparatus includes a particulate filter provided in the exhaust passage of an internal combustion engine that collects particulate matter in the exhaust gas discharged from the internal combustion engine, a particulate matter deposition amount detection device provided downstream of the particulate filter, and a abnormality determination portion. The particulate matter deposition amount detection device includes a detecting element that detects the particular matter that flows toward the particulate matter deposition amount detection device and that is not trapped by the particulate filter, and then outputs a value corresponding to a deposition amount deposited the particulate matter on the detecting element. The abnormality determination portion determines, whether an abnormality is present in the particulate filter based on the gradient of an output waveform of the particulate matter deposition amount detection device.

4 Claims, 6 Drawing Sheets

(56) References Cited

U.S. PATENT DOCUMENTS

| | | | |
|---|---|---|---|
| 7,146,804 B2* | 12/2006 | Yahata et al. | 60/295 |
| 7,171,802 B2* | 2/2007 | Inoue et al. | 60/297 |
| 7,171,803 B2* | 2/2007 | Saito et al. | 60/297 |
| 7,208,029 B2* | 4/2007 | Shirakawa et al. | 95/273 |
| 8,384,396 B2* | 2/2013 | Bromberg et al. | 324/636 |
| 2003/0131592 A1* | 7/2003 | Saito et al. | 60/295 |
| 2004/0211159 A1* | 10/2004 | Hamahata et al. | 55/282.3 |
| 2007/0089399 A1* | 4/2007 | Rhodes et al. | 60/278 |

FOREIGN PATENT DOCUMENTS

| | | |
|---|---|---|
| JP | U-62-18655 | 2/1987 |
| JP | A-08-068313 | 3/1996 |
| JP | A-2005-337782 | 12/2005 |
| JP | A-2005-344619 | 12/2005 |
| JP | A-2007-304068 | 11/2007 |
| JP | A-2009-144577 | 7/2009 |
| JP | A-2009-191694 | 8/2009 |
| JP | A-2009-293518 | 12/2009 |
| JP | A-2010-144695 | 7/2010 |
| JP | A-2011-021479 | 2/2011 |
| JP | A-2011-153930 | 8/2011 |
| WO | WO 2007/050384 A2 | 5/2007 |

OTHER PUBLICATIONS

Written Opinion issued in International Application No. PCT/IB2011/000493 dated Jun. 7, 2011.

Office Action issued in Japanese Application No. 2010-051801 dated Dec. 20, 2011 (with partial translation).

* cited by examiner

IN CASE WHERE DPF IS NORMAL

FIG. 4B

IN CASE WHERE THERE IS ABNORMALITY IN DPF

FIG. 5A

IN CASE WHERE DPF IS NORMAL

FIG. 5B

IN CASE WHERE THERE IS ABNORMALITY IN DPF

FIG.6

ABNORMALITY DETERMINATION APPARATUS FOR PARTICULATE FILTER

BACKGROUND OF THE INVENTION

1. Field of the Invention

The disclosure of Japanese Patent Application No. 2010-051801 filed on Mar. 9, 2010, including the specification, drawings and abstract is incorporated herein by reference in its entirety.

2. Description of the Related Art

In an internal combustion engine such as a diesel engine or the like, a diesel particulate filter (hereinafter referred to as a DPF) that collects particulate matter is arranged in an exhaust passage to remove particulate matter (hereinafter referred to as PM) from the exhaust gas discharged by the internal combustion engine. According to the related art (see, e.g., Japanese Patent Application Publication No. 2005-344619 (JP-A-2005-344619)), when there is a great discrepancy between the PM deposition amount of the DPF that is calculated based on the differential pressure across the DPF and the PM deposition amount of the DPF calculated by integrating the PM discharge amount calculated from an operation state of the internal combustion engine, it is determined that there is an abnormality in the DPF.

SUMMARY OF THE INVENTION

In JP-A-2005-344619, when the internal combustion engine is operating under conditions where only a small amount of PM is discharged, the differential pressure across the DPF does not change greatly. As a result, the amount of deposited PM cannot be accurately calculated, and it may be impossible to determine whether there is an abnormality in the DPF. That is, under certain conditions the utilization of the differential pressure across the DPF to determine whether an abnormality is in the DPF may result in an inaccurate determination.

The invention provides an abnormality determination apparatus for particulate filter that accurately determines whether a particulate filter is abnormal.

An aspect of the invention relates to an abnormality determination apparatus for a particulate filter. This abnormality determination apparatus for the particulate filter includes a particulate filter provided in an exhaust passage of an internal combustion engine to collect particulate matter present in an exhaust gas discharged from the internal combustion engine, a particulate matter deposition amount detection device provided in the exhaust passage downstream of the particulate filter, and an abnormality determination portion. The particulate matter deposition amount detection device includes a detecting element that detects the particulate matter that flows toward the particulate matter deposition amount detection device and that is not trapped by the particulate filter. The particulate matter deposition amount detection device outputs a value corresponding to a deposition amount deposited the particulate matter on the detecting element. The abnormality determination portion determines, whether an abnormality is present in the particulate filter based on a gradient of an output waveform of the particulate matter deposition amount detection device.

When particulate matter adhere to the particulate matter deposition amount detection device employed in the invention, the output of the particulate matter deposition amount detection device changes greatly. Thus, with the aid of the principle of this particulate matter deposition amount detection device, a particulate matter deposition amount can be accurately detected even when the internal combustion engine is in an operation state where the particulate matter discharge amount is too small to accurately calculate a particulate matter deposition amount in the field of the related art. The gradient of the output waveform of the particulate matter deposition amount detection device corresponds to the change in the amount of particulate matter that flows toward the particulate matter deposition amount detection device and that is not trapped by the particulate filter. A change in the amount of particulate matter flowing toward the particulate matter deposition amount detection device and not being trapped by the particulate filter is closely correlated with the presence of abnormality in the particulate filter. Thus, the gradient of the output waveform of the particulate matter deposition amount detection device represents the presence of abnormality in the particulate filter. In addition, the amount of particulate matter flowing toward the particulate matter deposition amount detection device that is not trapped by the particulate filter is originally small, and the particulate matter deposition amount detection device can accurately output even when the internal combustion engine is in an operation state where the PM discharge amount is small. Consequently, according to this embodiment of the invention, even if the amount of PM discharged from the internal combustion engine is low, the gradient of the output waveform of the particulate matter deposition amount detection device shows the presence of an abnormality in the particulate filter. Therefore, it is possible to accurately determine whether an abnormality is present in the particulate filter.

In the foregoing aspect of the invention, the abnormality determination portion may determine that the abnormality is present in the particulate filter if the gradient of the output waveform exceeds a reference value between an abnormal state of the particulate filter and a normal state of the particulate filter.

The reference value is a threshold to determine whether the particulate filter is abnormal or normal, and that it is determined that an abnormality is in present in the particulate filter when the reference value is exceeded. The reference value may be determined empirically.

If an abnormality is present in the particulate filter, a large amount of particulate matter is not trapped by the particulate filter and flows toward the particulate matter deposition amount detection device. Therefore the gradient of the output waveform of the particulate deposition amount detection device increases. In contrast, the gradient of the output waveform of the particulate matter deposition amount detection device may increase even if no abnormality is present in the particulate filter. However, this gradient is smaller than the gradient when an abnormality is present in the particulate filter. Thus, the abnormality determination portion determines that an abnormality is present in the particulate filter when the gradient of the output waveform of the particulate matter deposition amount detection device is larger than the reference value. According to the aforementioned construction, because the reference value is thus set, it is possible to accurately determine whether an abnormality is present in the particulate filter.

In the foregoing aspect of the invention, the particulate matter deposition amount detection device may execute a detecting element regeneration control to remove the particulate matter deposited on the detecting element.

When the detecting element regeneration control is executed, the particulate matter deposited on the detecting element is removed, and the output of the particulate matter deposition amount detection device temporarily returns to zero. Then, when if an abnormality is present in the particulate filter and a large portion of particulate matter is not trapped by the particulate filter and flows toward the particulate matter deposition amount detection device, a large amount of particulate matter are deposited on the detecting element over a short period of time. Thus, the output of the particulate matter deposition amount detection device changes to a large value in a short time after the output has become zero. That is, the gradient of the output waveform of the particulate matter deposition amount detection device increases. In contrast, when no abnormality is present in the particulate filter and the amount of particulate matter flowing toward the particulate matter deposition amount detection device without being trapped by the particulate filter is low, the output of the particulate matter deposition amount detection device gradually changes to a large value after the output has become zero. That is, the gradient of the output waveform of the particulate matter deposition amount detection device is small. According to the embodiment of the invention, the gradient of the output waveform of the particulate matter deposition amount detection device is significantly different depending on whether an abnormality is present in the particulate filter. Therefore, it is possible to accurately determine whether an abnormality is present in the particulate filter.

Further, the repeated execution of detecting element regeneration control may be executed. The repeated execution of detecting element regeneration control causes that the output of the particulate matter deposition amount detection device repeatedly changes to a large value over a short time after the output has become zero. Thus, the gradient of the output waveform of the particulate matter deposition amount detection device repeatedly increases, and it is possible to determine a plurality of times that an abnormality is present in the particulate filter. Therefore, it is possible to accurately determine whether an abnormality is present in the particulate filter.

In the foregoing aspect of the invention, the abnormality determination portion may determine whether the abnormality is present in the particulate filter when the internal combustion engine is in a transient operation state and the exhaust gas flows at a higher flow speed than during idling of the internal combustion engine.

The state where the internal combustion engine is in a transient operation state and the exhaust gas flows at a higher flow speed than during idling of the internal combustion engine as mentioned herein may be meant, for example, an accelerating state or a state where a large amount of intake air is drawn into the internal combustion engine.

When the internal combustion engine is in the transient operation state and the exhaust gas flows at a higher flow speed than during idling operation, the amount of particulate matter discharged from the internal combustion engine is large, and the flow speed of the exhaust gas is high. Thus, if an abnormality is present in the particulate filter, the amount of particulate matter flowing toward the particulate matter deposition amount detection device without being trapped by the particulate filter is high. However, if no abnormality is present in the particulate filter, the amount of particulate matter flowing toward the particulate matter deposition amount detection device without being trapped by the particulate filter remains low. According to the aforementioned construction, the amount of particulate matter that flows toward the particulate matter deposition amount detection device and that is not trapped by the particulate filter is significantly different depending on whether an abnormality is present in the particulate filter. Therefore, it is possible to accurately determine whether an abnormality is present in the particulate filter.

In the foregoing aspect of the invention, the particulate filter may be subjected to filter regeneration control to remove deposited particulate matter therefrom, and the abnormality determination portion may prohibits an determination of whether the abnormality is present in the particulate filter, when the filter regeneration control is executed.

If the filter regeneration control is executed, even when no abnormality is present in the particulate filter, the amount of particulate matter that is not trapped by the particulate filter and that flows toward the particulate matter deposition amount detection device may become excessive. This may result in an erroneous determination by the abnormality determination portion of whether an abnormality is present in the particulate filter. According to the aforementioned construction, when the filter regeneration control is executed, the determination by the abnormality determination portion on whether an abnormality is present in the particulate filter is prohibited from being made. Therefore, it is possible to accurately determine whether an abnormality is present in the particulate filter with avoiding an erroneous determination.

The invention ensures that the abnormality determination apparatus for the particulate filter accurately determines whether an abnormality is present in the particulate filter.

BRIEF DESCRIPTION OF THE DRAWINGS

The foregoing and further features and advantages of the invention will become apparent from the following description of an example embodiment of the invention with reference to the accompanying drawings, wherein like numerals are used to represent like elements and wherein.

DETAILED DESCRIPTION OF THE EMBODIMENT

Figure 1:
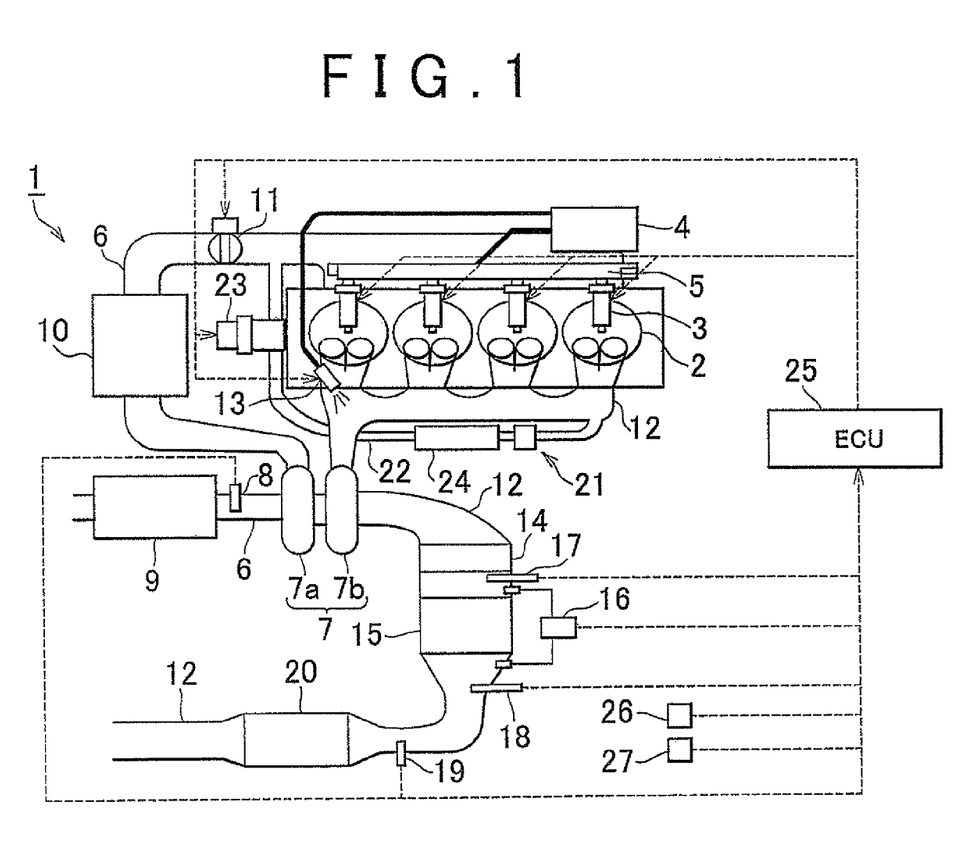
FIG. 1 shows the overall construction of an internal combustion engine according to the first embodiment of the invention.

FIG. 1 shows the overall construction of an internal combustion engine equipped with an abnormality determination apparatus for a particulate filter according to the first embodiment of the invention. An internal combustion engine 1 shown in FIG. 1 is a water-cooled four-stroke-cycle diesel engine having four cylinders 2 forming combustion chambers together with pistons respectively. The internal combustion engine 1 is mounted on a vehicle. The cylinders 2 are provided with fuel injection valves 3 respectively. Each fuel injection valve 3 is supplied with fuel such as light oil or the like which has been pumped up from a fuel tank by a supply pump 4. A common rail 5 has determined fuel injection pressure. Each fuel injection valve 3 injects the fuel into one of the cylinders 2 in an appropriate amount and at appropriate timings.

An intake passage 6 is connected to the internal combustion engine 1. A compressor 7a of a turbocharger 7 that is driven by exhaust gas is provided in the intake passage 6. An airflow meter 8 is provided in the intake passage 6 upstream of the compressor 7a. The airflow meter 8 detects the flow rate of air flowing through the intake passage 6. An air cleaner 9 is provided in the intake passage 6 upstream of the airflow meter 8. The air cleaner 9 removes dust, dirt, and the like from the air drawn into the internal combustion engine 1.

An intercooler 10 exchanges heat between intake air and outside air and is arranged in the intake. passage 6 downstream of the compressor 7a. A throttle valve 11 adjusts the flow rate of the intake air flowing through the intake passage 6 and is arranged in the intake passage 6 downstream of the intercooler 10. An electric actuator actuates the throttle valve 11. The intake passage 6 and components arranged therein constitute an intake system of the internal combustion engine 1.

An exhaust passage 12 is also connected to the internal combustion engine 1. A turbine 7b of the turbocharger 7 is arranged in the exhaust passage 12. A fuel addition valve 13 that adds the fuel to the exhaust gas flowing through the exhaust passage 12 is provided in the exhaust passage 12 upstream of the turbine 7b. The fuel addition valve 13 is supplied with the fuel from the fuel tank.

An oxidation catalyst 14 is provided in the exhaust passage 12 downstream of the turbine 7b. A DPF 15 is provided in the exhaust passage 12 downstream of the oxidation catalyst 14. The DPF 15 collects PM in the exhaust gas flowing through the exhaust passage 12. The DPF 15 is constructed by a multitude of cells serving as flow channels for exhaust gas. Inlet sides of the cells and outlet sides of the cells are alternately closed. The DPF 15 is made of a honeycombed heat-resistant ceramic base material such as cordierite or the like. The DPF 15 has porous cell walls. The exhaust gas that has flowed into the DPF 15 flows downstream while passing through the cell walls. In the meantime, the PM is collected by hole portions and surfaces of the cell walls and is deposited on the hole portions and the surfaces of the cell walls. The DPF 15 according to this embodiment of the invention corresponds to the particulate filter according to the invention.

A differential pressure sensor 16 and exhaust gas temperature sensors 17 and 18 are placed upstream and downstream of the DPF 15. The differential pressure sensor 16 detects the differential pressure across the DPF 15 to determine the amount of PM trapped by the DPF 15. The exhaust gas temperature sensors 17 and 18 are arranged immediately upstream and downstream of the DPF 15 respectively, and detect the temperature of the exhaust gas flowing into and out from the DPF 15, respectively.

A PM sensor 19 is provided in the exhaust passage downstream of the DPF 15. The PM sensor 19 has a detecting element 19a. The PM flowing toward the PM sensor 19 without being collected by the DPF 15 (i.e., the PM passed through the DPF 15) is deposited on the detecting element 19a, and the PM sensor 19 outputs a value corresponding to an amount of PM that is deposited on the detecting element 19a (a particulate matter deposition amount). As a result, the PM sensor 19 detects the amount of PM in exhaust gas or the like. The PM sensor 19 according to this embodiment of the invention corresponds to the particulate matter deposition amount detection device according to the invention.

Figure 2:
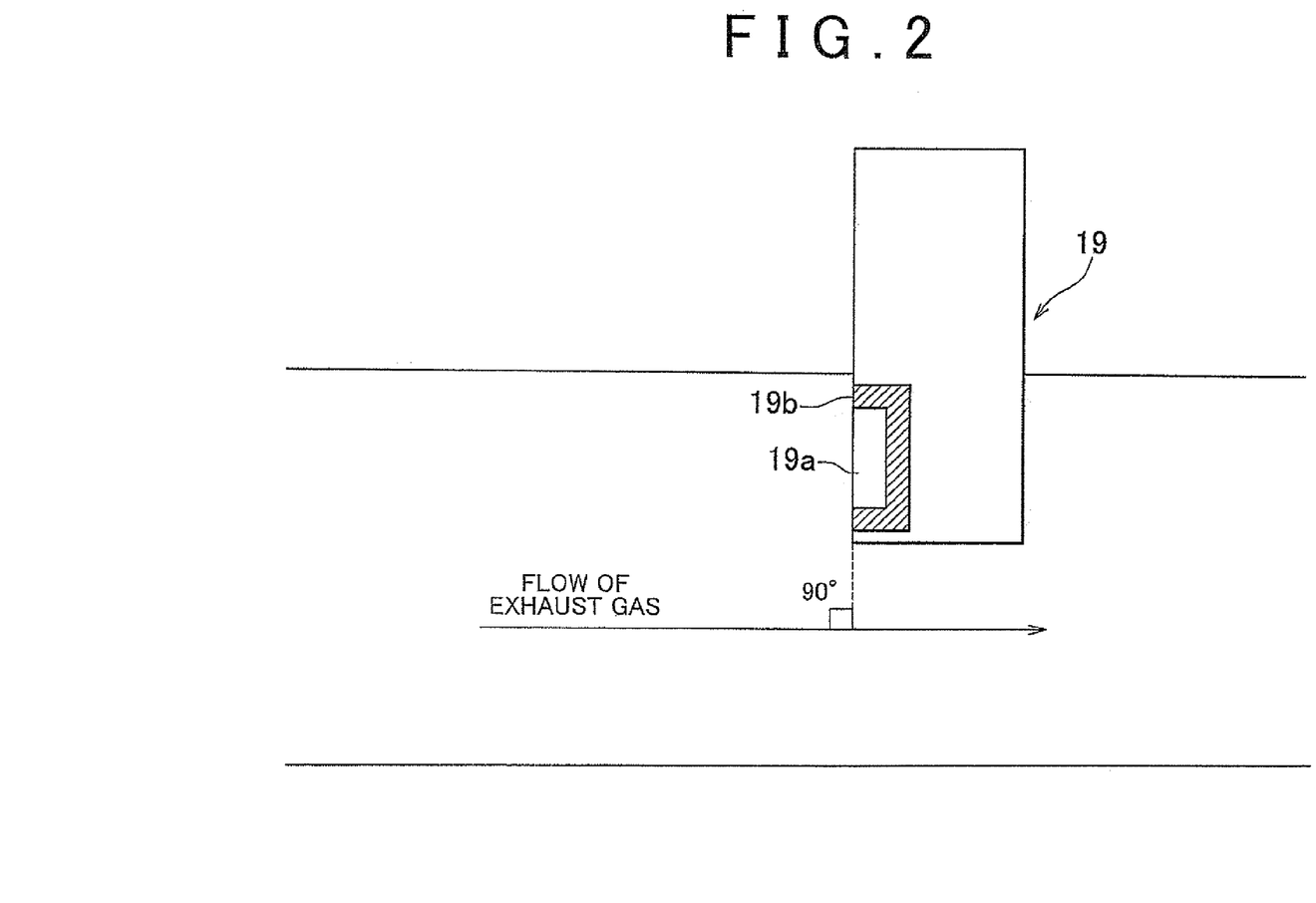
FIG. 2 shows the overall construction of a PM sensor according to the first embodiment of the invention.

FIG. 2 shows the overall construction of the PM sensor 19. As shown in FIG. 2, the PM sensor 19 has the detecting element 19a that has a plane perpendicular to the flow of the exhaust gas in the exhaust passage 12. Because the detecting element 19a has the plane perpendicular to the flow of the exhaust gas, PM is likely to be carried with the flow of the exhaust gas, collide with the detecting element 19a, and be deposited thereon. The detecting element 19a outputs the amount of the deposited PM detected to an ECU 25, and the ECU 25 stores the detected amount. A heater 19b is provided on and around a back face of the detecting element 19a of the PM sensor 19. In a normal state, the heater 19b heats up the detecting element 19a and maintains the temperature of detecting element 19a about 300° C. When the amount of the PM deposited on the detecting element 19a becomes equal to or exceeds a prescribed value, the heater 19b heats the detecting element 19a to about 800° C., and thus burns off the deposited PM.

Any type of sensor having such characteristics, such as a contact-type sensor, a resistance-type sensor, a combustion-type sensor, or the like may be employed as the PM sensor 19. For example, suitable sensors are described in Japanese Patent Application Publication No. 8-68313 (JP-A-8-68313), Japanese Patent Application Publication No. 2005-337782 (JP-A-2005-337782), and Japanese Patent Application Publication No. 2007-304068 (JP-A-2007-304068).

An oxidation catalyst 20 is provided in the exhaust passage 12 downstream of the PM sensor 19. The exhaust passage 12 and components arranged therein constitute the exhaust system of the internal combustion engine 1.

The internal combustion engine 1 includes a high-pressure EGR device 21 that recirculates a portion of the exhaust gas flowing through the exhaust passage 12 into the intake passage 6 at a high pressure. The exhaust gas recirculated by the high-pressure EGR device 21 is referred to as EGR gas. The high-pressure EGR device 21 includes a high-pressure EGR passage 22 through which the EGR gas flows; a high-pressure EGR valve 23 that adjusts the flow rate of the high-pressure EGR gas flowing through the high-pressure EGR passage 22; and a high-pressure EGR cooler 24 that cools the high-pressure EGR gas. The high-pressure EGR passage 22 connects to the exhaust passage 12 at a location upstream of the turbine 7b with the intake passage 6 at a location downstream of the throttle valve 11. The exhaust gas as the high-pressure EGR gas is delivered to the internal combustion engine 1 through the high-pressure EGR passage 22 at a high pressure. The high-pressure EGR valve 23 is provided in the high-pressure EGR passage 22 to adjust the cross-sectional area of the high-pressure EGR passage 22 and thus controls the flow rate .of the high-pressure EGR gas flowing through the high-pressure EGR passage 22. An electric actuator actuates the high-pressure EGR valve 23.

The internal combustion engine 1 described above includes the ECU (Engine Control Unit) 25 as an electronic control unit for controlling the internal combustion engine 1. The ECU 25 controls the operation state of the internal combustion engine 1 in accordance with the operating condition of the internal combustion engine 1 or driver inputs. Various sensors such as the airflow meter 8, the differential pressure sensor 16, the exhaust gas temperature sensors 17 and 18, the PM sensor 19, a crank position sensor 26, an accelerator position sensor 27, and the like are connected to the ECU 25 via electric wires. Output signals from these sensors are input to the ECU 25. Furthermore, actuators such as the fuel injection valves 3, the throttle valve 11, the fuel addition valve 13, and the high-pressure EGR valve 23 are connected to the ECU 25 via electric wires, and controlled by the ECU 25. When the ECU 25 receives output signals from the crank position sensor 26, the accelerator position sensor 27, and the like, the ECU 25 determines the operating state of the internal combustion engine 1, and controls the internal combustion engine 1 and the associated components based on the determined operating state of the engine.

For example, in addition to typical controls such as fuel injection control and the like, the ECU 25 may also execute controls to regenerate the capacity of the DPF 15 to trap PM (hereinafter referred to as filter regeneration control). In filter regeneration control, fuel is supplied to the oxidation catalyst 14 arranged in front of the DPF 15 when the amount of the PM trapped by the DPF 15 becomes equal to or exceeds a threshold value, and the DPF 15 is heated to, for example, 600° C. by an oxidation reaction of the fuel, so that the PM trapped by the DPF 15 is oxidized and removed. The fuel may be supplied by, for example, adding the fuel into the exhaust gas from the fuel addition valve 13, or performing a post injection, which differs from the main injection in the internal combustion engine 1.

Further, the ECU 25 may also execute controls to remove the PM deposited on the detecting element 19a of the PM sensor 19 (hereinafter referred to as a detecting element regeneration control). In the detecting element regeneration control, when the amount of the PM deposited on the detecting element 19a of the PM sensor 19 becomes equal to or exceeds a threshold value, the heater 19b heats the detecting element 19a to about 800° C. to burn off the deposited PM. When the detecting element regeneration control is executed, all of the PM that has been deposited on the detecting element 19a is removed, and hence the output of the PM sensor 19 also decreases to approximately zero and indicates that no PM is deposited. For example, in the case of an abnormal DPF shown in FIG. 3A, the detecting element regeneration control is executed during periods of 0 to 100 sec, 600 to 800 sec, and 900 to 1100 sec.

The abnormalities that may be present in the DPF 15 include breakage, damage or the like. When an abnormality is present in the DPF 15, the amount of PM that is trapped by the DPF 15 decreases, thereby causing exhaust emission properties to deteriorate. Thus, it is desirable to abnormalities in the DPF 15 detected sooner rather than later. In the related art, the differential pressure sensor 16 is used, and it is determined that an abnormality is present in the DPF 15 When there is the discrepancy between a calculated amount of PM trapped in the DPF 15 based on differential pressure across the DPF 15 and an amount of PM trapped in the DPF 15 calculated by integrating a PM discharge amount calculated from an operating state of the internal combustion engine 1. However, if the internal combustion engine 1 is discharging only a small amount of PM, the change in the differential pressure across the DPF 15 is minimal, thereby making it difficult to accurately calculate the amount of PM that is deposited. As a result, it may not be possible to determine whether an abnormality is present in the DPF 15. That is, under certain conditions it may be difficult to accurately determine whether an abnormality is present in the DPF 15 if the determination is based on the differential pressure across the DPF 15.

Figure 3A:
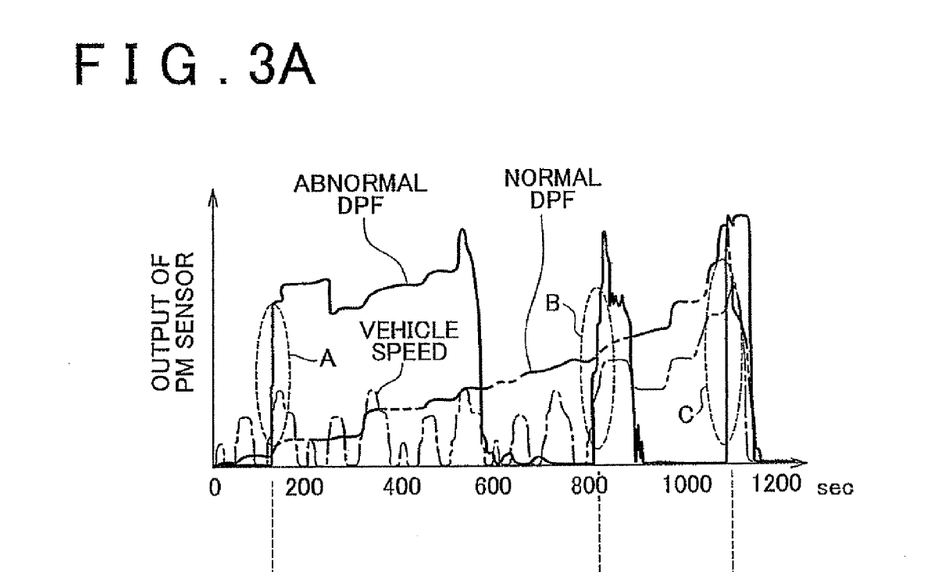
FIG. 3 includes views of the output waveform from the PM sensor according to the first embodiment of the invention and a gradient of the output waveform respectively.
Figure 3B:
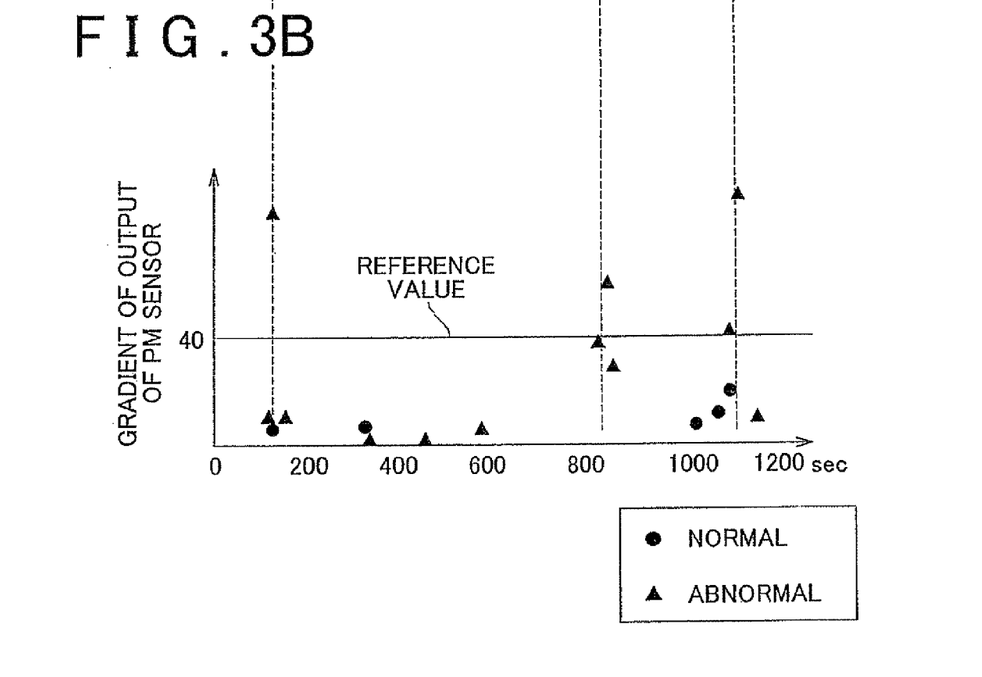

Thus, in this embodiment of the invention, whether an abnormality is present in the DPF 15 is determined based on the gradient of the output waveform from the PM sensor 19. FIG. 3A shows the output waveform of the PM sensor 19. The output waveform of the PM sensor 19 greatly differs depending on whether an abnormality is present in the DPF 15. The output waveform of the PM sensor 19 differs remarkably when the output rises after the output has become zero. The output waveform at this moment is subjected to first-order differentiation to calculate the gradient of the output waveform (a first-order derivative with respect to time) and then it is determined whether an abnormality is present in the DPF 15. That is, as indicated by A, B, and C in FIG. 3A, the gradient of the output of the PM sensor 19 is captured when the output rises after the detecting element regeneration control is executed and the output has become zero, and then it is determined that an abnormality is present in the DPF 15. FIG. 3B shows the gradient of the output waveform of the PM sensor 19. As is apparent from FIG. 3B, when an abnormality is present in the DPF 15, the gradient of the output of the PM sensor 19 is large when the output rises after the output has become zero by executing the detecting element regeneration control.

Figure 4A:
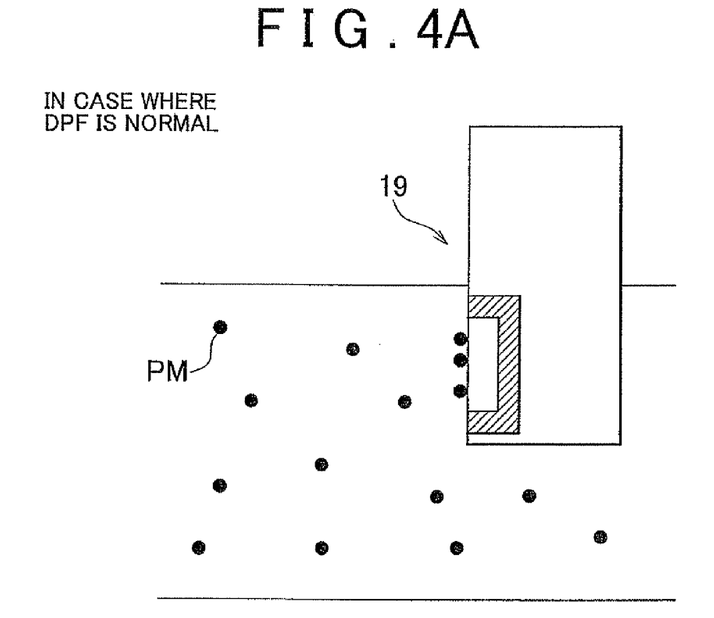
FIG. 4A is a view showing the behavior of PM near a detecting element of the PM sensor when a DPF is normal according to the first embodiment of the invention.
Figure 4B:
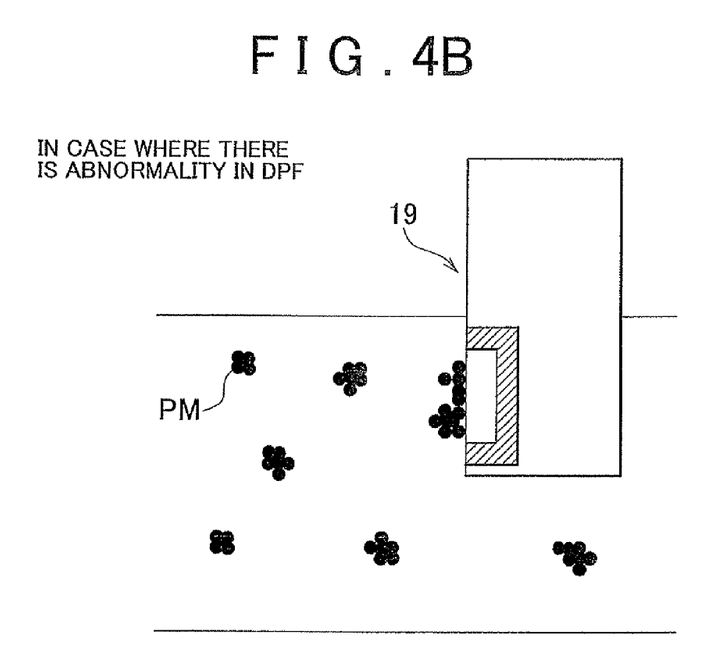
FIG. 4B is a view showing the behavior of PM near the detecting element of the PM sensor when the DPF is abnormal according to the first embodiment of the invention.

The gradient of the output waveform of the PM sensor 19 when the output increases corresponds to an increase in the amount of the PM that is not trapped by the DPF 15 and flows toward the PM sensor. The increase in the amount of the PM flowing toward the PM sensor 19 and being not trapped by the DPF 15 is closely correlated with the presence of abnormalities in the DPF 15, such as breakage thereof, damage thereto, or the like. Thus, the gradient of the output waveform of the PM sensor 19 represents the presence of abnormality in the DPF 15. In addition, if an abnormality is present in the DPF 15, the PM in exhaust gas is condensed when the abnormality is present in the DPF 15 as shown in FIG. 4B in comparison with the behavior of the PM near the detecting element 19a of the PM sensor 19 when the DPF 15 is normal as shown in FIG. 4A, and the frequency which the PM collides with the detecting element 19a of the PM sensor 19 decreases when the abnormality is present in the DPF 15. However, because the PM is already condensed when colliding with the detecting element 19a, the output of the PM sensor 19 greatly increases. That is, the gradient of the output waveform of the PM sensor 19 increases. This occurs even when the internal combustion engine 1 is in an operation state where the PM discharge amount is small. In addition, the amount of the PM flowing toward the PM sensor 19 that is not trapped by the DPF 15 is originally small. The PM sensor 19 can accurately detect the amount of PM even when the internal combustion engine 1 is in an operation state where the PM discharge amount is small. Consequently, according to this embodiment of the invention, even if the amount of PM discharged from the internal combustion engine 1 is low, the gradient of the output waveform of the PM sensor 19 shows the presence of an abnormality in the DPF 15. Therefore, it is possible to accurately determine whether an abnormality is present in the DPF 15.

It is determined that an abnormality is present in the DPF 15 if the gradient of the output waveform of the PM sensor 19 exceeds a reference value as a threshold value to determine an abnormal state of the DPF 15 and a normal state of the DPF 15.

As shown in FIG. 3B, the above reference value may be determined empirically. When reference value is exceeded, it is possible to determine that an abnormality is present in the DPF 15. In other words, the reference value is a threshold value to determine an abnormal state of the DPF 15 and a normal state of the DPF 15.

If an abnormality is present in the DPF 15, a large amount of the PM is not trapped by the DPF 15 and flows toward the PM sensor 19. In ranges A, B, and C of FIG. 3A, each gradient of the output waveform of the PM sensor 19 is larger than the reference value, as shown in FIG. 3B. In contrast, the gradient of the output waveform of the PM sensor 19 may increase even if no abnormality is present in the DPF 15. However, this gradient is smaller than when an abnormality is present in the DPF 15. Thus, as described above, when the gradient of the output waveform of the PM sensor 19 is larger than the reference value, it may be determined that an abnormality is present in the DPF 15. According to this embodiment of the invention, because the reference value is thus set, it is possible to accurately determine whether an abnormality is present in the DPF 15.

Further, the PM sensor 19 is subjected to the detecting element regeneration control to remove the PM deposited on the detecting element 19a. When the detecting element regeneration control is executed, the PM deposited on the detecting element 19a is burned off, and the output of the PM sensor 19 temporarily returns to zero. Then, when if an abnormality is present in the DPF 15 and a large portion of the PM is not trapped by the DPF 15 and flows toward the PM sensor 19, a large amount of PM are deposited on the detecting element 19a over a short period of time. Thus, the output of the PM sensor 19 changes to a large value in a short time after the output has become zero, as indicated by A, B, and C of FIG. 3A. That is, the gradient of the output waveform of the PM sensor 19 increases at these moments indicated by A, B, and C of FIG. 3A. In contrast, when no abnormality is present in the DPF 15 and the amount of the PM flowing toward the PM sensor 19 is low, the output of the PM sensor 19 gradually changes to a large value over a long time after the output has become zero, as indicated by the output waveform of the normal DPF shown in FIG. 3A. That is, the gradient of the output waveform of the PM sensor 19 when no abnormality is present in the DPF 15 is smaller than when an abnormality is present in the DPF 15. According to this embodiment of the invention, the gradient of the output waveform of the PM sensor 19 is significantly different depending on whether an abnormality is present in the DPF 15 when the detecting element regeneration control is executed. Therefore, it is possible to accurately determine whether an abnormality is present in the DPF 15.

Figure 5A:
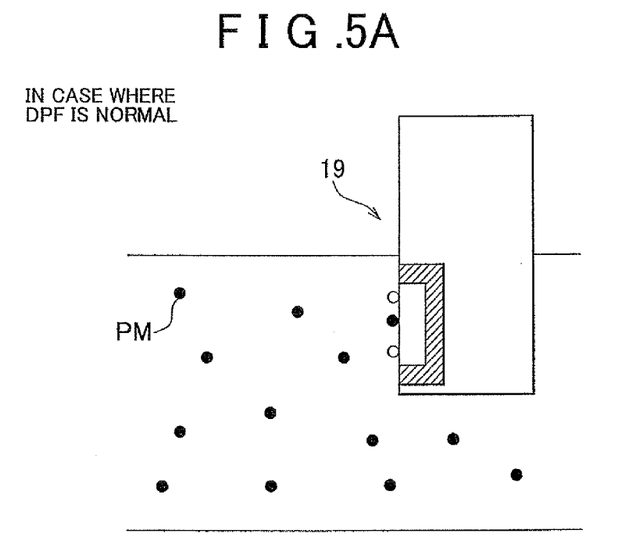
FIG. 5A is a view showing the behavior of PM near the detecting element of the PM sensor according to the first embodiment of the invention when the detecting element is heated to 300° C. and the DPF is normal.
Figure 5B:
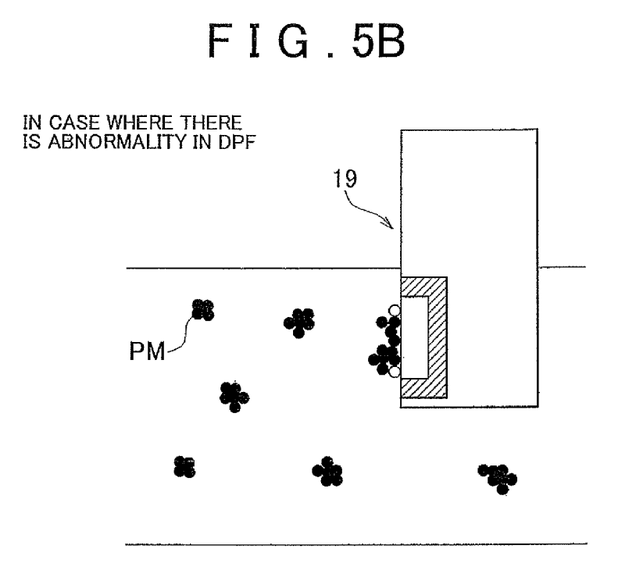
FIG. 5B is a view showing the behavior of PM near the detecting element of the PM sensor according to the first embodiment of the invention when the detecting element is heated to 300° C. and the DPF is abnormal.

Furthermore, the detecting element 19a of the PM sensor 19 is usually heated to about 300° C. by the heater 19b. Thus, when the DPF 15 is normal, some of the PM deposited on the detecting element 19a is burned off as indicated by blank circles as shown in FIG. 5A. That is, the speed of deposition/condensation of the PM on the detecting element 19a is reduced due to the burning speed of the deposited PM. The output of the PM sensor 19 also increases only gradually. However, if there is an abnormality in the DPF 15, the PM are condensed upon colliding with the detecting element 19a of the PM sensor 19, and the speed of deposition/condensation of the PM on the detecting element 19a is higher than the burning speed of the PM. Therefore, the output of the PM sensor 19 increases abruptly. This also serves to make the gradient of the output waveform of the PM sensor 19 significantly different depending on whether an abnormality is present in the DPF 15. Therefore, it is possible to accurately determine whether an abnormality is present in the DPF 15.

Further, the repeated execution of the detecting element regeneration control causes that the output of the PM sensor 19 repeatedly changes to a large value over a short time after the output has become zero. Thus, as indicated by A, B, and C in FIG. 3A, the gradient of the output waveform of the PM sensor 19 repeatedly increases, and it is possible to determine a plurality of times that there is an abnormality present in the DPF 15. Therefore, it is possible to accurately determine whether an abnormality is present in the DPF 15.

It should be noted herein that the process of determining whether an abnormality is present in the DPF 15 is executed when the internal combustion engine 1 is in a transient operation state and exhaust gas flows at a higher flow speed than during idling operation. The transient operation state is not an operation state where the internal combustion engine 1 is operated in a static state but an operation state where an engine speed and/or a torque of the internal combustion engine 1 is changing. The state where the internal combustion engine 1 is in the transient operation state and exhaust gas flows at a higher flow speed than during idling operation as mentioned herein is meant, for example, a driving state where a vehicle is accelerated upon an accelerator pedal being pressed or a state where a large amount of intake air is drawn into the internal combustion engine 1. As indicated by the vehicle speed in FIG. 3A, the ranges A and B are the ranges that shows the driving state where the vehicle is accelerated, and the range C is a high-Ga range in which a large amount of intake air is drawn into the internal combustion engine 1.

When the internal combustion engine 1 is in the transient operation state and exhaust gas flows at a higher flow velocity than during idling operation, the amount of the PM discharged from the internal combustion engine 1 is large, and the flow speed of exhaust gas is high. Thus, if an abnormality is present in the DPF 15, the amount of the PM flowing toward the PM sensor 19 that is not trapped by the DPF 15 is high. However, if no abnormality is present in the DPF 15, the amount of the PM flowing toward the PM sensor 19 that is not trapped by the DPF 15 remains low. According to this embodiment of the invention, the amount of the PM that flows toward the PM sensor 19 that is not trapped by the DPF 15 is significantly different depending on whether an abnormality is present in the DPF 15. Therefore, it is possible to accurately determine whether an abnormality is present in the DPF 15.

In contrast, if the filter regeneration control is executed, the execution of the determination whether an abnormality is present in the DPF 15 is prohibited.

If filter regeneration control is executed, even when no abnormality is present in the DPF 15, the amount of the PM that is not trapped by the DPF 15 may become excessive. This may result in an erroneous determination of whether an abnormality is present in the DPF 15. In this embodiment of the invention, when filter regeneration control is executed, the determination on whether an abnormality is present in the DPF 15 is prohibited from being made. Therefore, it is possible to accurately determine whether an abnormality is present in the DPF 15 with avoiding an erroneous determination.

Further, even when the amount of the PM discharged from the internal combustion engine 1 is very low, for example, when the after-injection is performed by the fuel injection valves 3 or the flow rate of EGR gas is set low, the determination of whether an abnormality is present in the DPF 15 is prohibited.

When the amount of the PM discharged from the internal combustion engine 1 is very low, even when an abnormality is present in the DPF 15, the amount of the PM flowing toward the PM sensor 19 and being trapped by the DPF 15 may be low. If the process of determining whether an abnormality is present in the DPF 15 is executed under such conditions, the resulting determination may be erroneous. In this embodiment of the invention, when the amount of the PM discharged from the internal combustion engine 1 is very low, execution of the process of determining whether an abnormality is present in the DPF 15 is prohibited. Therefore, it is possible to accurately determine whether an abnormality is present in the DPF 15 with avoiding an erroneous determination.

Figure 6:
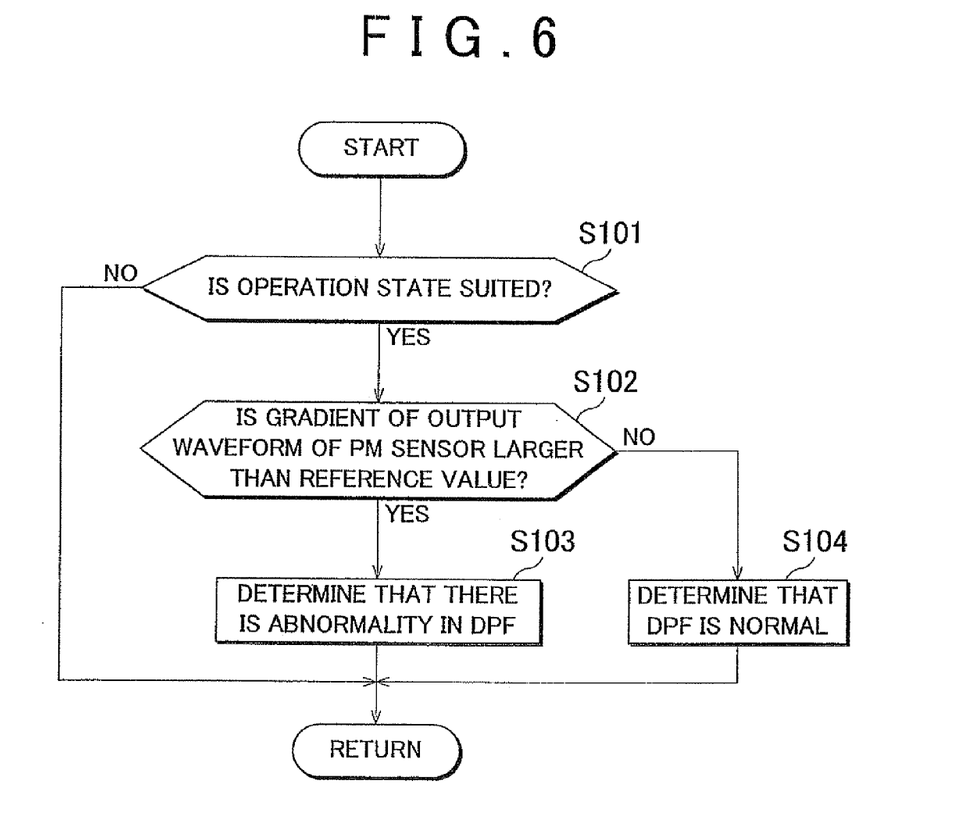
FIG. 6 is a flowchart showing an abnormality determination operation for the DPF according to the first embodiment of the invention.

An operation for determining whether an abnormality is present in the DPF 15 will be described based on the flowchart shown in FIG. 6. The flowchart in FIG. 6 is shows the operation for determining whether an abnormality is present in the DPF 15. The routine is executed by the ECU 25 at predetermined intervals. The ECU 25, which executes the operation, serves as the abnormality determination portion according to the invention.

When the operation shown in FIG. 6 is started, it is determined in S 101 whether the operational state of the internal combustion engine 1 will permit the determination of whether an abnormality is present in the DPF 15. If the engine reaches an operational state where the amount of the PM discharged from the internal combustion engine 1 is large and the change in the flow speed of exhaust gas is large after the termination of detecting element regeneration control as indicated by, for example, the ranges A, B, and C of FIG. 3A, it is considered a suitable time to determine whether an abnormality is present in the DPF 15. In contrast, if the filter regeneration control is executed, or if an operational state where the amount of the PM discharged from the internal combustion engine 1 is extremely small such as when, for example, after-injection is carried out by the fuel injection valves or the flow rate of EGR gas is set low, it is not a suitable time to determine whether an abnormality is present in the DPF 15. If it is determined in S101 that the operational state of the internal combustion engine 1 will permit the determination of whether an abnormality is present in the DPF 15, the operation proceeds to S102. If it is determined in S101 that the operational state of the internal combustion engine 1 will not permit the determination of whether an abnormality is present in the DPF 15, the operation ends.

In S102, it is determined whether the gradient of the output waveform of the PM sensor 19 is larger than the reference value. In this case, as shown in FIG. 3A, the output of the PM sensor 19 is stored in the ECU 25 for a predetermined period to acquire an output waveform, and the output waveform is subjected to first-order differentiation to acquire a gradient (a first-order derivative). As shown in FIG. 3B, the acquired gradient is then compared with the reference value. If it is determined in S102 that the gradient is larger than the reference value, the operation proceeds to S101 However, if it is determined in S102 that the gradient does not exceed the reference value, the operation proceeds to S104.

It is determined in S103 that an abnormality is present in the DPF 15. In contrast, it is determined in S104 that the DPF 15 is normal. After steps S103 and S104, the operation ends.

The operation described above can accurately determine whether an abnormality is present in the DPF 15 using the gradient of the output waveform of the PM sensor 19.

The abnormality determination apparatus for the particulate filter according to the invention is not limited to the foregoing embodiment of the invention, but may be modified in various ways without departing from the gist of the invention.

For example, as the gradient of the output waveform of the PM sensor 19 used to determine whether an abnormality is present in the DPF 15, the gradient of the output waveform when the output rises just after detecting element regeneration control in the above embodiment (i.e., after the output has become zero). However, this gradient is not the only one available. Even if the gradient of the output waveform of the PM sensor 19 exceeds the reference value not after the output has become zero, it is appropriate to determine that an abnormality is present in the DPF 15. Further, the PM sensor 19 has the detecting element 19*a* usually heated to 300° C. by the heater 19*b*. However, the detecting element 19*a* may not usually be heated by the heater 19*b*. Further, detecting element regeneration control may be performed simultaneously with a filter regeneration control.

The invention claimed is:

1. An abnormality determination apparatus for a particulate filter, the apparatus comprising:
a particulate filter provided in an exhaust passage of an internal combustion engine to collect particulate matter present in an exhaust gas discharged from the internal combustion engine;
a particulate matter deposition amount detection device provided in the exhaust passage downstream of the particulate filter, wherein
the particulate matter deposition amount detection device includes a detecting element that detects the particulate matter that flows toward the particulate matter deposition amount detection device and that is not trapped by the particulate filter, and
the particulate matter deposition amount detection device outputs a value corresponding to a deposition amount of the particulate matter deposited on the detecting element; and
an electronic control unit having control logic that causes the electronic control unit to determine whether an abnormality is present in the particulate filter based on a gradient of an output waveform of the particulate matter deposition amount detection device, wherein
when the gradient of the output waveform exceeds a reference value between an abnormal state of the particulate filter and a normal state of the particulate filter, the electronic control unit determines that the abnormality is present in the particulate filter;
when the electronic control unit determines that the abnormality is present in the particulate filter, the particulate matter deposition amount detection device executes a detecting element regeneration control to remove the particulate matter deposited on the detecting element; and
the electronic control unit subsequently determines whether the abnormality is present in the particulate filter based on the gradient of the output waveform after an output of the particulate matter deposition amount detection device has become zero by the detecting element regeneration control.

2. The abnormality determination apparatus according to claim 1, wherein
the electronic control unit determines whether the abnormality is present in the particulate filter when the internal combustion engine is in a transient operation state and the exhaust gas flows at a higher flow speed than that during idling of the internal combustion engine.

3. The abnormality determination apparatus according to claim 1, wherein
the particulate filter is subjected to filter regeneration control to remove deposited particulate matter therefrom, and
the electronic control unit prohibits a determination of whether the abnormality is present in the particulate filter, when the filter regeneration control is being executed.

4. The abnormality determination apparatus according to claim 1, wherein
the detecting element is usually heated such that the particulate matter deposited on the detecting element is burned off.

\* \* \* \* \*